United States Patent
Anzelde et al.

(10) Patent No.: US 7,797,632 B2
(45) Date of Patent: Sep. 14, 2010

(54) METHOD FOR EXPOSING GRAPHICAL USER INTERFACE LAYOUT LOGIC AND PARAMETERS

(75) Inventors: Thomas Rudolf Anzelde, San Jose, CA (US); Todd Michael Eischeid, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/553,369

(22) Filed: Oct. 26, 2006

(65) Prior Publication Data

US 2008/0104499 A1 May 1, 2008

(51) Int. Cl.
*G06F 17/00* (2006.01)
(52) U.S. Cl. .................................. 715/273
(58) Field of Classification Search ............... 715/271, 715/273, 243, 700, 764
See application file for complete search history.

(56) References Cited

U.S. PATENT DOCUMENTS

| | | | | | |
|---|---|---|---|---|---|
| 4,386,412 | A | * | 5/1983 | Ito | 708/174 |
| 4,811,257 | A | * | 3/1989 | Sumitani et al. | 708/131 |
| 4,905,163 | A | * | 2/1990 | Garber et al. | 706/55 |
| 5,189,633 | A | * | 2/1993 | Bonadio | 708/142 |
| 5,526,475 | A | * | 6/1996 | Razdow | 715/205 |
| 5,559,939 | A | * | 9/1996 | Wada et al. | 715/267 |
| 5,647,009 | A | * | 7/1997 | Aoki et al. | 382/100 |
| 5,732,001 | A | * | 3/1998 | Nakayama et al. | 708/162 |
| 6,028,593 | A | * | 2/2000 | Rosenberg et al. | 345/156 |
| 7,273,375 | B2 | * | 9/2007 | Wolf et al. | 434/188 |
| 7,391,423 | B1 | * | 6/2008 | Manzari et al. | 345/619 |
| 7,509,588 | B2 | * | 3/2009 | Van Os et al. | 715/835 |
| 2002/0106613 | A1 | * | 8/2002 | Takada | 434/1 |
| 2007/0009867 | A1 | * | 1/2007 | Bagues | 434/208 |
| 2007/0188496 | A1 | * | 8/2007 | Igusa | 345/440 |
| 2008/0028308 | A1 | * | 1/2008 | Brownlee et al. | 715/275 |
| 2008/0108030 | A1 | * | 5/2008 | Bayne | 434/188 |
| 2009/0055733 | A1 | * | 2/2009 | Graeber | 715/271 |
| 2009/0162819 | A1 | * | 6/2009 | Wolf et al. | 434/211 |

OTHER PUBLICATIONS

Kahan, Personal Calculator Has Key to Solve Any Equation f(x)=0, Google 1979, pp. 20-26.*

* cited by examiner

*Primary Examiner*—Cong-Lac Huynh
(74) *Attorney, Agent, or Firm*—Kunzler Needham Massey & Thorpe

(57) ABSTRACT

A method is disclosed for exposing graphical user interface layout logic and parameters. The method may be used with any language or tool capable of creating a graphical user interface. The equations affecting an element's properties in the graphical user interface are exposed to the designer. The designer is able to use the equations to anticipate what value is required to make a necessary adjustment. Further, the present invention emphasizes the values adjusted by the designer as well as the results from calculating the equation, so the designer can easily see adjustments made. As the designer makes changes, the changed values may be emphasized and the corresponding affect the value had on the element may also be displayed with a corresponding emphasis. The present invention eliminates graphical user interface designer's reliance on trial-and-error methods of element control by providing the designer with the knowledge of how the element will be affected before a value is arbitrarily applied.

9 Claims, 4 Drawing Sheets

METHOD FOR EXPOSING GRAPHICAL USER INTERFACE LAYOUT LOGIC AND PARAMETERS

BACKGROUND OF THE INVENTION

1. Field of the Invention

This invention relates to graphical user interface designing and more particularly relates to exposing graphical user interface layout logic and parameters to facilitate designing graphical user interfaces.

2. Description of the Related Art

Graphical user interface (GUI) designers are faced with a challenge when designing a GUI, they must design a GUI that typically includes elements such as buttons, images, text, and links without knowing the details of how the elements will be positioned on the GUI. The calculations which determine the properties of each element are not exposed to the designer. As a result, the designer is forced to use a guess-and-check method of inputting values then observing the layout and repeating if necessary.

There are many languages and development tools to facilitate and assist designers in developing a GUI. However, currently available tools do not help the designer to project the location of an element when a value is adjusted. In addition, it is left to the intuition of the designer to realize what adjustment is needed. Therefore, the designer proceeds with caution adjusting values in small increments to obtain the desired location.

From the foregoing discussion, it should be apparent that a need exists for a method that exposes graphical user interface layout logic and parameters to a user. Beneficially, such a method would save time and money by eliminating a wasteful guess-and-check method to position elements in a GUI and allow GUI designers to determine the values needed to lay out the elements in the intended manner.

SUMMARY OF THE INVENTION

The present invention has been developed in response to the present state of the art, and in particular, in response to the problems and needs in the art that have not yet been fully solved by currently available applications and tools used to develop graphical user interfaces. Accordingly, the present invention has been developed to provide a method for exposing graphical user interface layout logic and parameters that overcome many or all of the above-discussed shortcomings in the art.

A method of the present invention is presented for exposing graphical user interface layout logic and parameters. In one embodiment, the method includes providing an equation populated with numerical values. The equation corresponds to a property of an element. The calculation of the equation gives a result that directly affects the property of the element.

The method also includes accepting a replacement value and replacing one or more numerical value in the equation with the replacement value. The replacement value, if different from the value it replaced, alters the property of the element. The equation is calculated to produce a result. Finally, the value, the equation, and the result are displayed. Displaying this information provides a user with the information needed to know how a value adjustment will alter an element.

In a further embodiment, the method includes integrating a plug-in to extend functionality. The method may also include displaying a standardizing control which sets the numerical values of the equation to standardized values. In certain embodiments, the method includes displaying an augmenting control which, when activated, augments usability.

The method is not limited to only accepting one value or displaying information from just one calculation. The method may also comprise displaying a plurality of equations and results. The method may also include accepting and displaying a plurality of values. Once the information is displayed, in one embodiment, the method includes emphasizing the accepted values. Additionally, the method may include emphasizing how an accepted value affects an element.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
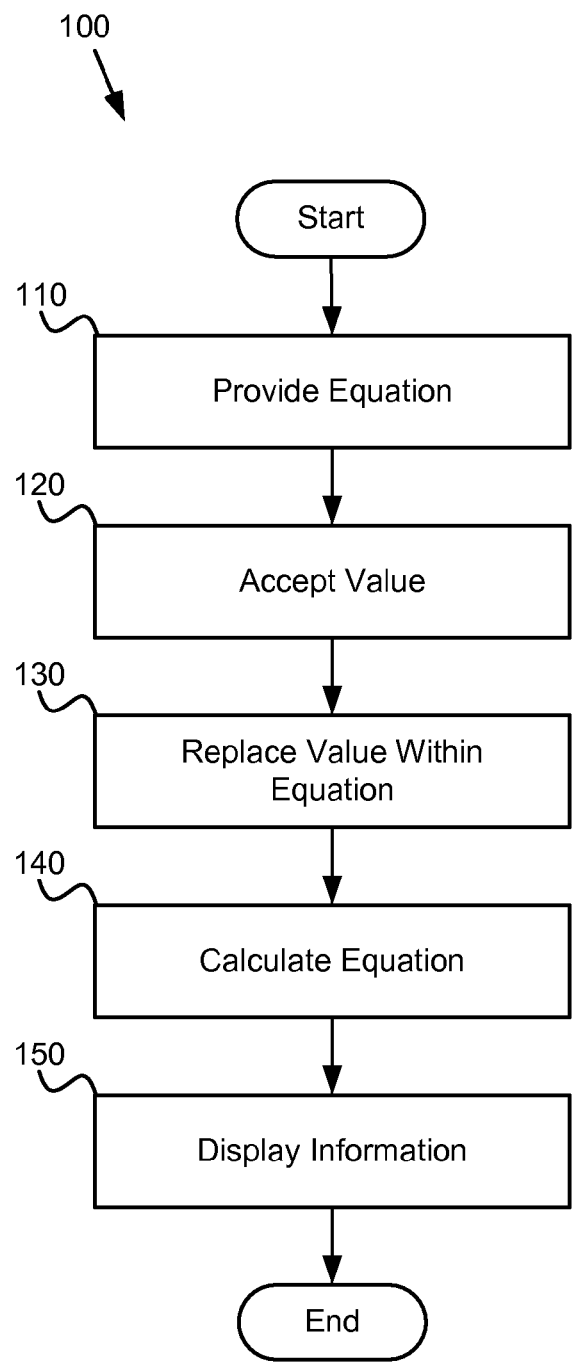
FIG. 1 is a schematic flow chart diagram illustrating one embodiment of a method for exposing graphical user interface layout logic and parameters in accordance with the present invention.

Many of the functional units described in this specification have been labeled as modules, in order to more particularly emphasize their implementation independence. For example, a modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one method for exposing graphical user interface layout logic and parameters in accordance with the present invention. The method 100 includes providing 110 an equation, accepting 120 a value, replacing 130 a value within the equation, calculating 140 the equation, and displaying 150 information. The method 100 teaches exposing graphical user interface layout logic and parameters.

Providing 110 an equation may include utilizing an equation developed to affect one or more properties of an element. In one embodiment, the equation is populated with numerical values. The equation may include standard, numerical values which precisely define one or more properties of the element. Properties of the element affected by the equation, may be discernible properties such as vertical weighting, horizontal weighting, or the like. The element may be displayed on the graphical user interface. Similarly, the equation, populated with the numerical values, and the result from calculating the equation may initially be displayed in association with the graphical user interface.

Accepting 120 a value may include receiving a user-specified value, which is intended to affect one or more properties of the element. A user typically analyzes the initial layout of the element in the graphical user interface. In one embodiment, the user is capable of determining the affect that one or more properties have on the element because the affecting equation is displayed. The user may identify the value needed to adjust the at least one property of the element to the desired setting.

In one embodiment, replacing 130 the value within the equation may include substituting the accepted value for the previous value. Replacing 130 the value within the equation effectively alters one or more properties of the element. If the numerical equation and result was initially displayed, the user would be able to calculate the value needed to adjust one or more properties of the element to the desired setting.

Calculating 140 the equation may include utilizing the accepted value as the replacement and determining the new result. The numerical equation, if now different from the previous numerical equation, is calculated to return the new result. The new result effectively adjusts one or more properties of the element. The adjustment may be discernible as the element is displayed on the graphical user interface.

Displaying 150 information may facilitate alterations of one or more properties of the element. The numerical equation and result may be displayed in association with the graphical user interface. Displaying 150 information may be utilized on the same panel as the graphical user interface. In another embodiment, displaying 150 information is utilized on a separate panel such as a panel capable of being docked within the development software being used. Displaying 150 information may initially occur with standard values.

Figure 2:
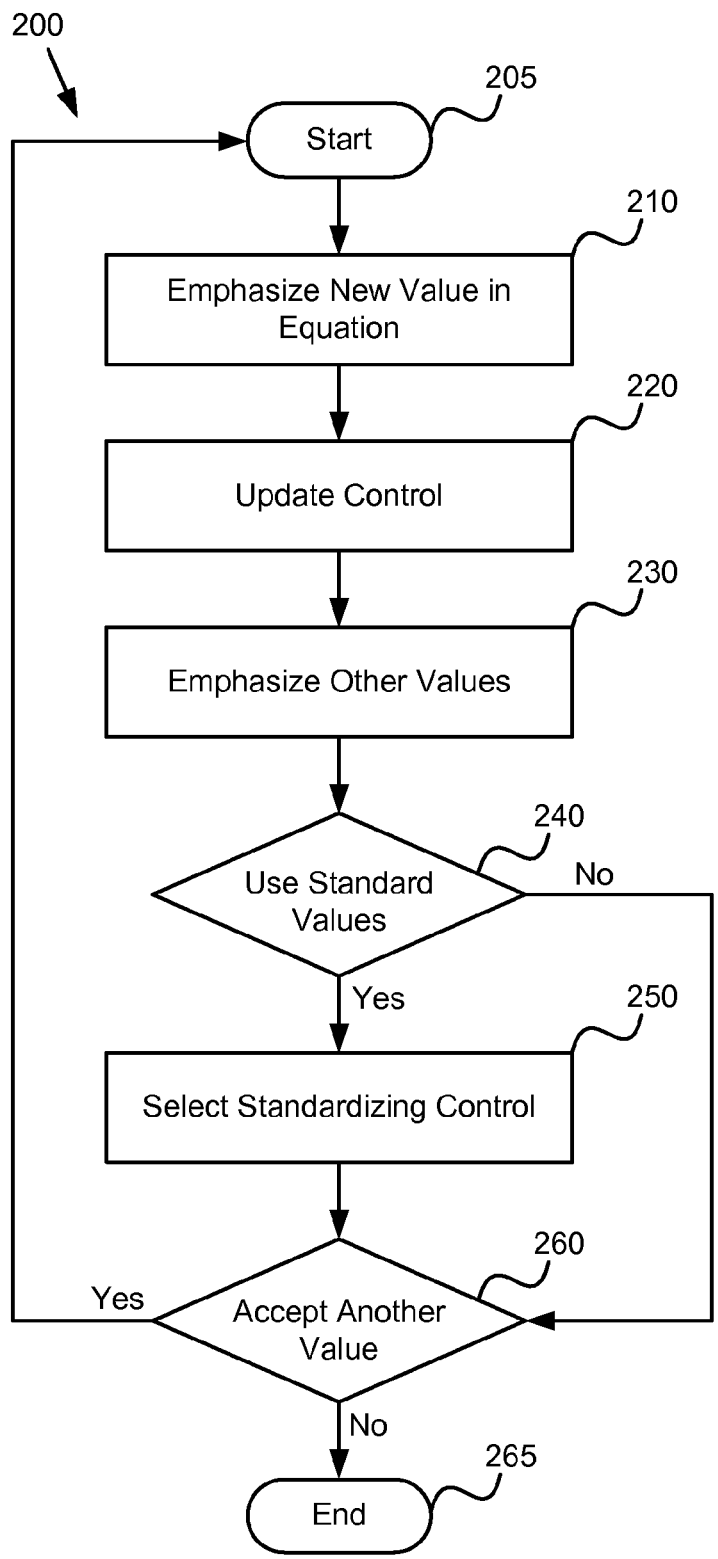
FIG. 2 is a schematic flow chart diagram illustrating one embodiment of another method for exposing graphical user interface layout logic and parameters in accordance with the present invention.

FIG. 2 depicts another method for exposing graphical user interface layout logic and parameters in accordance with the present invention. The method 200 includes emphasizing 210 a new value in the equation, updating 220 the element, emphasizing 230 other values, ascertaining if using 240 standard values is desired, selecting 250 a standardizing control, and ascertaining if accepting 260 another value is desired. The method 200 teaches exposing graphical user interface layout logic and parameters.

Emphasizing 210 a new value in the equation includes identifying the new value. The new value may be the accepted value of step 120. In one embodiment, a plurality of new values are accepted. It may be possible to have a new value for each coefficient of the equation. Emphasizing 210 a new value may include highlighting, underlining, bolding the type-face, or the like to set the value apart from other values. When there are a plurality of new values, each new value may be uniquely emphasized, identically emphasized, or any combination therebetween. Emphasizing 210 a new value allows a user to identify which value was inputted and accepted since standard values and subsequent accepted values may be the same.

Updating 220 an element includes calculating 140 the equation to receive a result that affects one or more properties of the element. In one embodiment, there may be multiple equations that affect a particular element. Once the equation or equations are calculated, the element may be adjusted accordingly. Updating 229 the element may include affecting a discernible quality of the element such as vertical weighting, horizontal weighting, or the like. Updating 220 the element may include emphasizing the affect the accepted value had on the element. This may be facilitated by highlighting the old element property or indicating the change via a discernible trait.

An equation may have a plurality of values that are adjusted. It may be essential to emphasize every value altered for visual purposes. The values that may be emphasized are any combination of accepted values, equations, or results. To facilitate discernment, emphasizing 230 other values may include using highlights of different colors to distinguish between accepted values, results, equations, or any combination of the preceding. Additionally, emphasizing 230 other values may use the emphasis associated with emphasizing how an accepted value affects the element.

At any point, standard values may be assigned to the equation to restore the element back to its original properties. The method continues by ascertaining 240 whether to use standard values. If using standard values is desired, then selecting 250 a standardizing control includes displaying a control that, when selected, standardizes the equation by returning the values to a predetermined, numerical state. The predetermined, numerical state may be set by the user, or may be set by the application used to design the graphical user interface. In one embodiment, selecting 250 a standardizing control can be used to standardize a plurality of selected equations.

If using standard values is not desired, or after selecting 250 the standardizing control, the method allows for accepting 260 another value. If accepting 260 another value is desired, then the sequence 200 proceeds to start 205. If accepting 260 another value is not desired, then the sequence ends at step 265.

Figure 3:
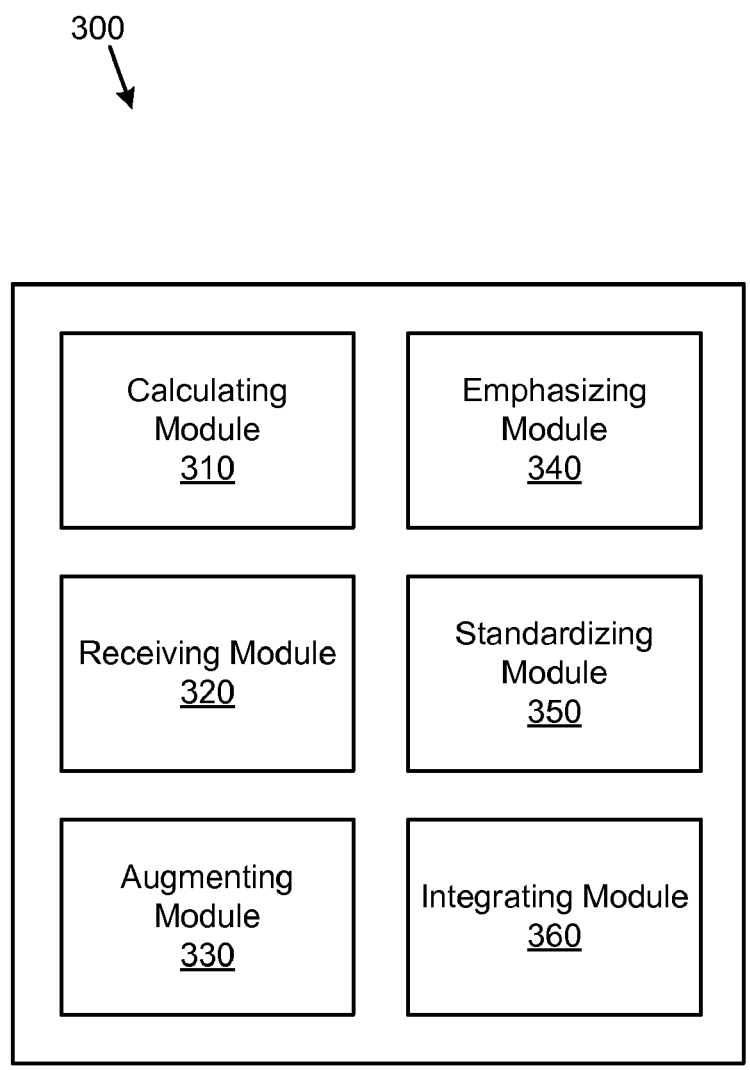
FIG. 3 is a schematic block diagram illustrating one embodiment of a computer program apparatus for exposing graphical user interface layout logic and parameters in accordance with the present invention.

FIG. 3 depicts one embodiment of a computer program apparatus for exposing graphical user interface layout logic and parameters. The computer program apparatus 300 includes a calculating module 310, a receiving module 320, an augmenting module 330, an emphasizing module 340, a standardizing module 350, and an integrating module 360. The computer program apparatus 300 is one embodiment for exposing graphical user interface layout logic and parameters.

The calculating module 310 may calculate the equation, which is populated with numerical values. The calculating module 310 may produce a result which affects one or more properties of an element. After calculating the equation, in one embodiment, the calculating module returns the results to the application used to design the graphical user interface. The application may then be able to display the element with the adjustment of one or more properties of the element.

The receiving module 320, in one embodiment, facilitates accepting a new value. The receiving module may facilitate accepting a new value for each coefficient of the equation. Once a new value is accepted, the receiving module 320 replaces the old value in the equation with the accepted value.

The augmenting module 330 may augment controls for customization. In one embodiment, the augmenting module 330 is a control that when selected allows a user to define a new operation of the present invention. For example, if a color selector was desired, the augmenting module 330 would be selected and the user would define the functionality of the augmented color control. Similarly, if a standardizing control was not included and a standardizing control was desired, the user would select the augmenting module 330 and define the augmented standardizing control.

The emphasizing module 340 may emphasize an accepted value to facilitate identification of the accepted value in the equation. In one embodiment, the emphasizing module 340 emphasizes each accepted value with a highlight, an underline, a bold type-face, or the like. In certain embodiments, the emphasizing module 340 emphasizes the accepted values and the result. The emphasizing module 340 may emphasize just the result.

The emphasizing module 340 may emphasize the effect an accepted value had on a element. In one embodiment, the emphasizing module 340 emphasizes the old property of the element to allow a user to discern the affect of the accepted value. The emphasis on the old property may be identical in type as the emphasis on the accepted value.

In one embodiment, the standardizing module 350 may standardize the numerical values in the equation. The standardizing module 350 may affect a plurality of equations. In one embodiment, the standard values of the standardizing module 350 may be assigned by the application used to design the graphical user interface, by the user, or preset by the method. The standardizing module 350 may be a control that when selected standardizes the values. In certain embodiments, the standardizing module 350 may consist of keystrokes that invoke standardizing the values. The integrating module 360, may include facilitating integrating a plug-in. The plug-in may be designed to increase functionality.

Figure 4:
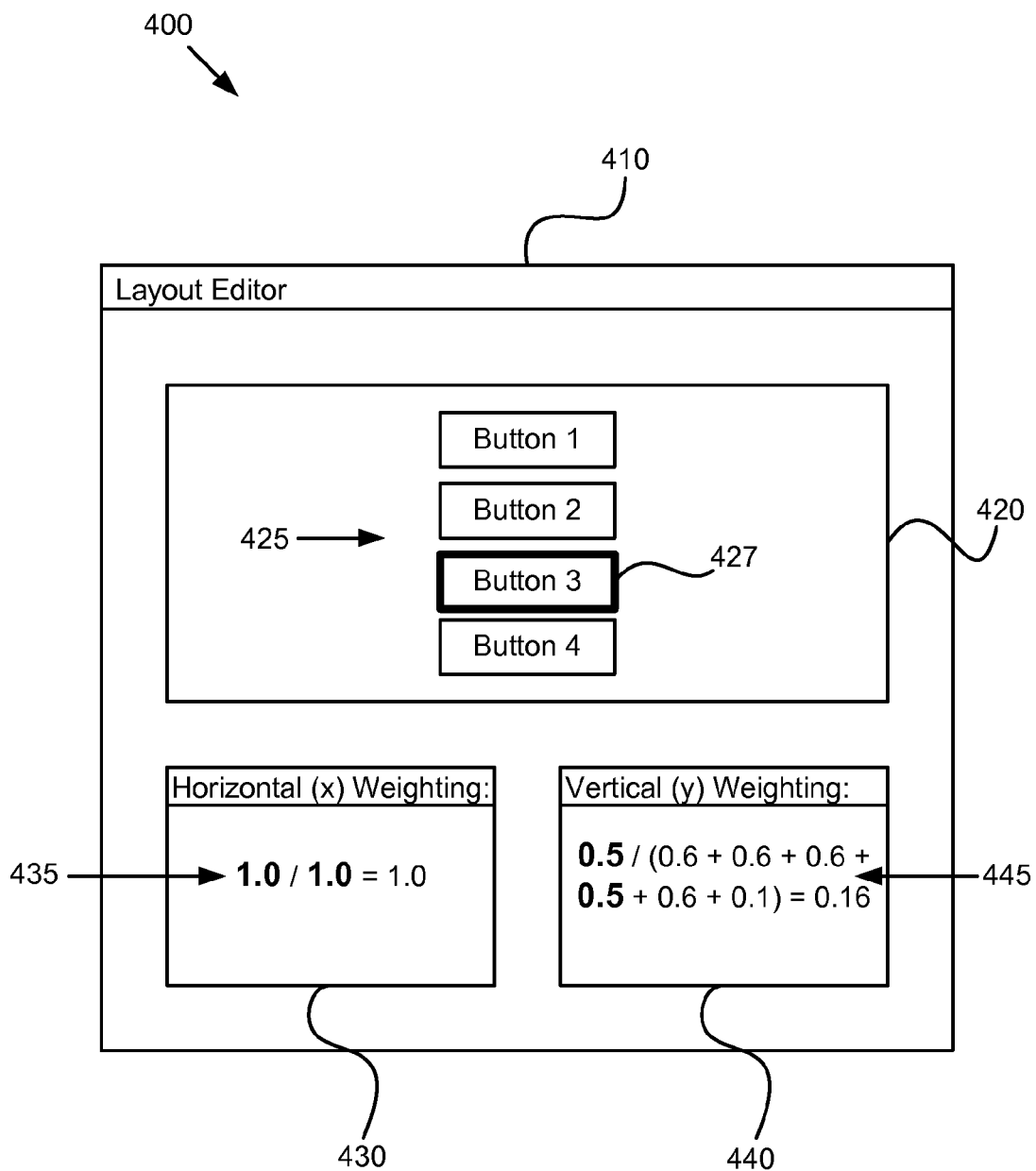
FIG. 4 is a schematic block diagram illustrating one embodiment of a layout manager in accordance with the present invention.

FIG. 4 depicts one example of a layout manager in accordance with the present invention. The layout manager 400 includes a layout editor 410, a display field 420, elements 425, an emphasized element 427, a first property field 430, a first property calculation 435, a second property field 440, and a second property calculation 445. The layout manager 400 is one embodiment for exposing graphical user interface layout logic and parameters.

The layout editor 410 may facilitate editing the graphical user interface. In certain embodiments, the layout editor 410 facilitates viewing the graphical user interface as the graphical user interface is being developed as well as viewing one or more calculations used to adjust element properties. The layout editor 410 may include an augmenting control to augment usability.

The display field 420 may display the graphical user interface as it is being developed. The elements 425 may comprise the graphical user interface. The elements 425 may be adjusted according to alterations in the calculation due to newly accepted values. The emphasized element 427 may be the element currently being adjusted. In FIG. 4, the emphasized element 427 is shown in its old position. In one embodiment (not shown), after being adjusted, the emphasized element 427 is displayed in both its new position and its old position, the old position may be deemphasized or be characterized by any other discernible quality.

The first property field 430 may contain a title that specifies a property of an element. In the depicted embodiment, the title of the first property field 430 is "Horizontal (x) Weighting." In the depicted embodiment, the first property calculation 435 displays the equation used to adjust the horizontal weighting of the element. In the depicted embodiment, certain coefficients of the first property calculation are emphasized to distinguish standard values from user inputted values. The first property calculation 435 may display the result from calculating the equation. The first property calculation 435 may provide necessary information to a designer to determine what value is needed to precisely position an element.

The second property field 440 may contain a title that specifies a property of an element. In the depicted embodiment, the title of the second property field 440 is "Vertical (y) Weighting." In the depicted embodiment, the second property calculation 445 displays the equation used to adjust the vertical weighting of the element. In the depicted embodiment, certain coefficients of the second property calculation are emphasized to distinguish standard values from user provided values. The second property calculation 445 may display the result from calculating the equation. The second property calculation 445 may provide necessary information to a designer to determine what value is needed to precisely position an element.

Referenced throughout this specification is the term "element" which is used in conjunction with a graphical user interface. It should be recognized that the present invention may apply to any control, image, text, field, or any other element applicable to a graphical user interface. The present invention exposes graphical user interface layout logic and parameters, so the layout can be anticipated by designers no matter what element they are designing into the graphical user interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code programmed for exposing graphical user interface layout logic and parameters, the operations of the computer program product comprising:

displaying an equation comprising a plurality of numerical values on a layout editor display, the equation corresponding to a position of an element on a graphical user interface display, the graphical user interface display forming part of the layout editor display;

accepting a replacement value for an existing one of the plurality of numerical values, the equation with the existing numerical value corresponding to a first value of the position of the element;

replacing the existing numerical value with the replacement value, the equation with the replacement value corresponding to a second value of the position of the element;

calculating the equation with the replacement value to produce a result; and displaying the equation with the replacement value and the result on the layout editor display, and displaying the element in a new position associated with the second value on the graphical user interface display.

2. The computer program product of claim 1, the operations further comprising integrating a plug-in to extend functionality.

3. The computer program product of claim 1, the operations further comprising displaying a standardizing control, the standardizing control configured to standardize the values of the equation.

4. The computer program product of claim 1, the operations further comprising displaying a plurality of equations and results.

5. The computer program product of claim 1, the operations further comprising accepting and displaying a plurality of values.

6. The computer program product of claim 1, the operations further comprising emphasizing accepted values used in the equation.

7. The computer program product of claim 1, the operations further comprising displaying an augmenting control, the augmenting control configured to augment usability.

8. The computer program product of claim 1, the operations further comprising emphasizing how the accepted replacement value affects the position of the element.

9. The computer program product of claim 8, wherein emphasizing how the accepted replacement value affects the position of the element comprises simultaneously displaying the element in an old position associated with the first value and the new position associated with the second value.

* * * * *